(12) United States Patent
Chan et al.

(10) Patent No.: US 11,587,596 B2
(45) Date of Patent: Feb. 21, 2023

(54) FLEXIBLE DESICCANT TAPE

(71) Applicant: Seagate Technology LLC, Fremont, CA (US)

(72) Inventors: Chee Yin Chan, Singapore (SG); Wei Leng Tee, Singapore (SG); Than Zaw Myint, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 224 days.

(21) Appl. No.: 17/072,389

(22) Filed: Oct. 16, 2020

(65) Prior Publication Data
US 2022/0118400 A1    Apr. 21, 2022

(51) Int. Cl.
*G11B 33/14* (2006.01)
(52) U.S. Cl.
CPC ................ *G11B 33/1453* (2013.01)
(58) Field of Classification Search
None
See application file for complete search history.

(56) References Cited

U.S. PATENT DOCUMENTS

| | | | |
|---|---|---|---|
| 2,842,223 A * | 7/1958 | Zall | B01D 53/26 206/0.5 |
| 3,260,234 A | 7/1966 | Serrano et al. | |
| 5,276,577 A * | 1/1994 | Brooks | G11B 23/505 360/99.18 |
| 5,304,419 A * | 4/1994 | Shores | C09K 3/1018 95/902 |
| 6,103,141 A * | 8/2000 | Incorvia | B01L 3/5023 156/331.7 |
| 6,112,888 A * | 9/2000 | Sauro | B65D 81/266 53/111 R |
| 6,861,289 B2 | 3/2005 | Baar et al. | |
| 8,398,889 B2 | 3/2013 | Kupsky et al. | |
| 8,773,812 B1 * | 7/2014 | Gustafson | G11B 33/1446 360/99.18 |
| 9,208,825 B1 * | 12/2015 | Gustafson | G11B 33/1466 |
| 11,276,436 B1 * | 3/2022 | Zhang | G11B 33/1466 |
| 2005/0129936 A1 | 6/2005 | Husemann et al. | |
| 2006/0132975 A1 * | 6/2006 | Ma | G11B 33/1453 |
| 2007/0171567 A1 * | 7/2007 | Choi | G11B 33/1446 360/97.16 |
| 2010/0157468 A1 * | 6/2010 | Shen | G11B 33/146 360/97.12 |
| 2011/0212281 A1 * | 9/2011 | Jacoby | G11B 25/043 428/35.8 |
| 2016/0336045 A1 * | 11/2016 | Beatty | B65B 31/00 |
| 2018/0370204 A1 * | 12/2018 | Ose | B01J 20/28035 |
| 2019/0123302 A1 * | 4/2019 | Luo | H01L 51/5246 |

OTHER PUBLICATIONS

Tesa SE, Product Information on "tesa® 61531" (undated), 2 pages.

\* cited by examiner

*Primary Examiner* — William J Klimowicz
(74) *Attorney, Agent, or Firm* — Faegre Drinker Biddle & Reath

(57) ABSTRACT

A hard disk drive includes a base deck and a cover. The cover is coupled to the base deck to create an enclosure. The hard disk drive also includes tape that covers at least a portion of the cover and the base deck. The tape includes an adhesive layer, which includes an adhesive material and a moisture-absorbent material.

20 Claims, 7 Drawing Sheets

FLEXIBLE DESICCANT TAPE

SUMMARY

In certain embodiments, a hard disk drive includes a base deck, a cover coupled to the base deck to create an enclosure, and tape adhered to at least a portion of the cover and the base deck. The tape includes an adhesive layer, which comprises an adhesive material and a moisture-absorbent material.

In certain embodiments, a hard disk drive includes a base deck and a cover coupled to the base deck to create an enclosure. The base deck and cover have one or more interior surfaces. The hard disk drive includes tape adhered to at least one of the interior surfaces. The tape includes an adhesive layer with an adhesive material in which a moisture-absorbing material is suspended.

In certain embodiments, a method for assembling a hard disk drive is disclosed. The method includes coupling a cover to a base deck of the hard disk drive. The method further includes applying a piece of tape to both the cover and the base deck such that the tape is adhered to the cover and the base deck. The tape includes a facestock layer and an adhesive layer comprising an adhesive material and a moisture-absorbent material.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
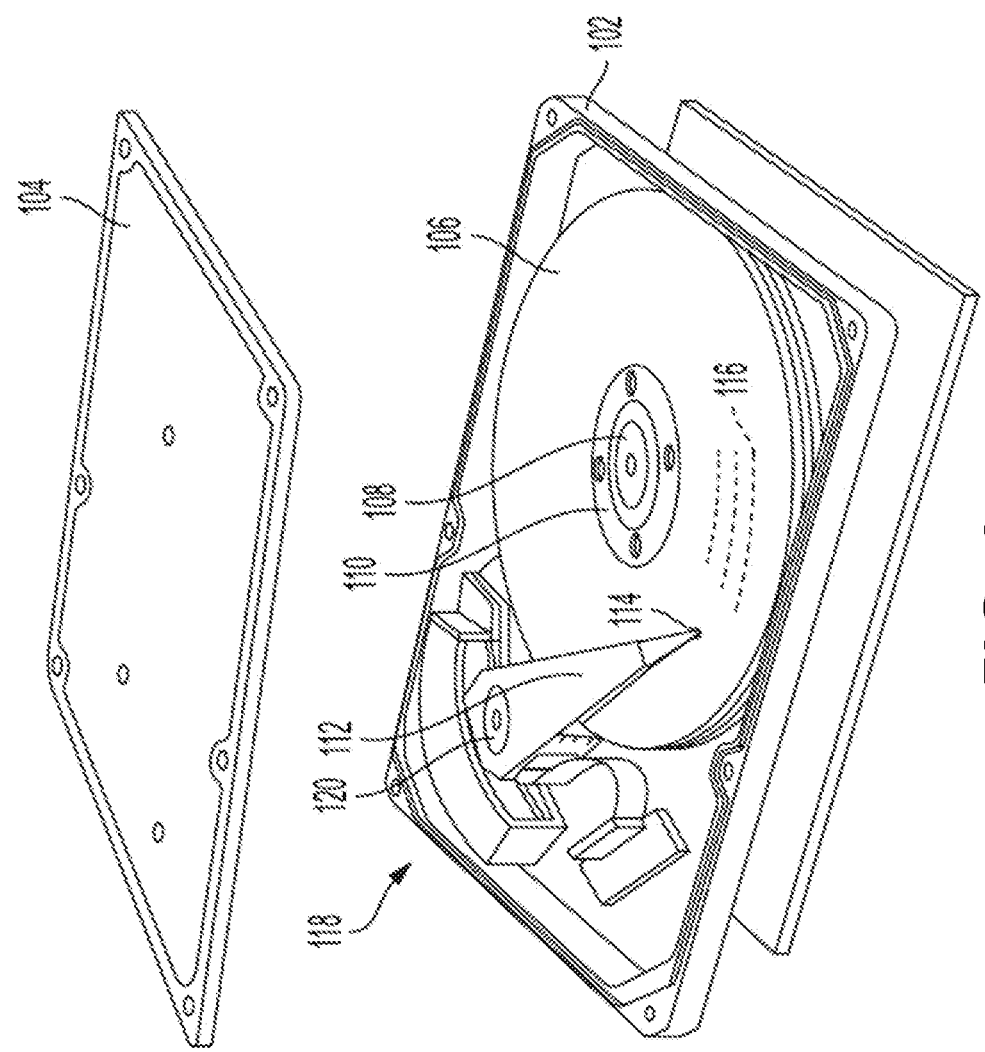
FIG. 1 shows an exploded, perspective view of a hard disk drive, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Hard disk drives may have components or functions that are sensitive to moisture. For example, moisture can accelerate degradation of certain components (e.g., read/write heads) or degrade performance of various functions (e.g., fly height) of hard disk drives. The existence of moisture within hard disk drives can be a result of moisture that is captured during assembly of hard disk drives, moisture released by components inside the hard disk drives after assembly, and/or moisture ingress from the external environment of the hard disk drives after assembly. Moisture within the hard disk drives can be absorbed by traditional environmental control assemblies, but the hard disk drives may not have enough available real estate for such assemblies. Certain embodiments of the present disclosure are accordingly directed to methods and devices for mitigating excess moisture in hard disk drives and/or the effects of excess moisture in hard disk drives.

Figure 2:
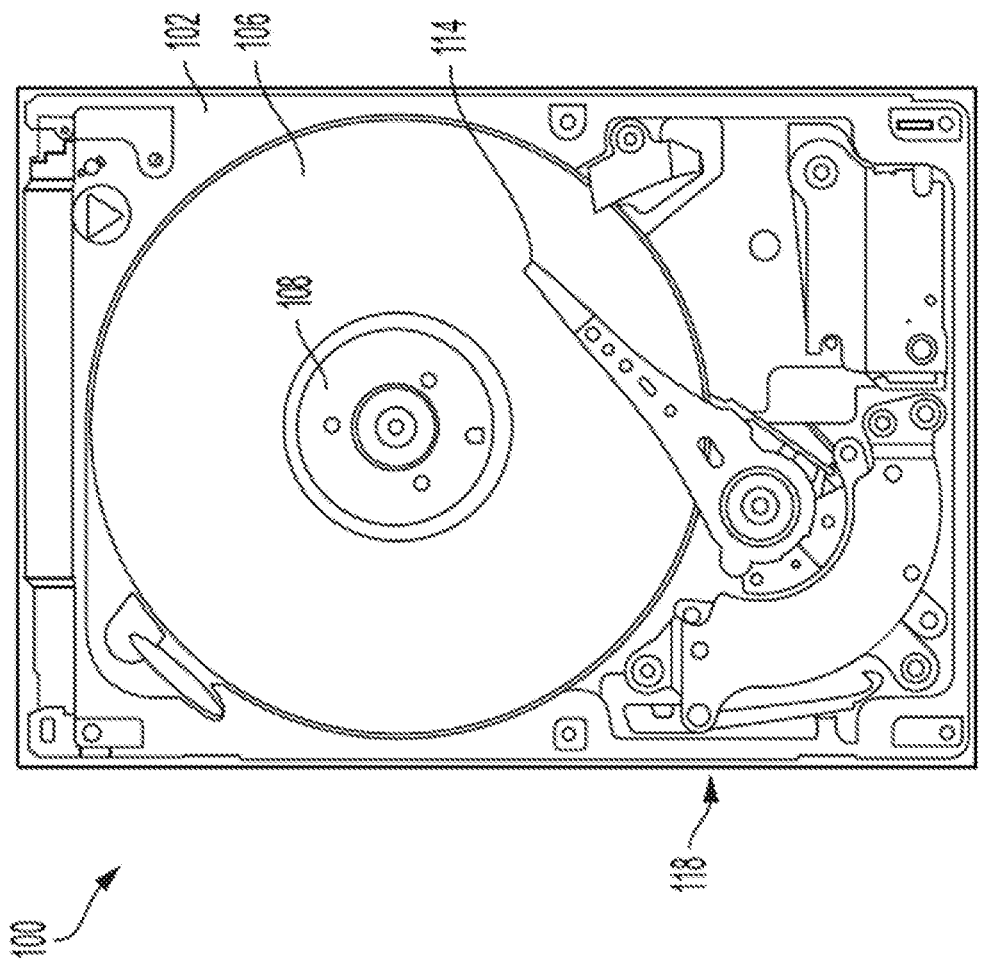
FIG. 2 shows a top view of the hard disk drive of FIG. 1, in accordance with certain embodiments of the present disclosure.

FIG. 1 shows an exploded, perspective view of a hard disk drive 100 having a base deck 102 and a top cover 104 that creates an enclosure that houses various components of the hard disk drive 100. FIG. 2 shows a top view of the hard disk drive 100. Not all components shown in FIG. 1 are shown in FIG. 2, and vice versa.

The hard disk drive 100 includes magnetic recording media 106 (individually referred to as a magnetic recording medium) coupled to a motor assembly 108 by a disk clamp 110. The hard disk drive 100 also includes an actuator assembly 112 that positions read/write heads 114 over data tracks 116 on the magnetic recording media 106. During operation, the motor assembly 108 rotates the magnetic recording media 106 while the actuator assembly 112 is driven by a voice coil motor assembly 118 to pivot around a pivot bearing 120.

The read/write heads 114 write data to the magnetic recording media 106 by generating and emitting a magnetic field towards the magnetic recording media 106 which induces magnetically polarized transitions on the desired data track 116. The magnetically polarized transitions are representative of the data. The read/write heads 114 sense (or "read") the magnetically polarized transitions with a magnetic transducer. As the magnetic recording media 106 rotates adjacent the read/write heads 114, the magnetically polarized transitions induce a varying magnetic field into a magnetic transducer of the read/write heads 114. The magnetic transducer converts the varying magnetic field into a read signal that is delivered to a preamplifier and then to a read channel for processing. The read channel converts the read signal into a digital signal that is processed and then provided to a host system (e.g., server, laptop computer, desktop computer). For hard disk drives that utilize heat-assisted magnetic recording (HAMR), sliders on which the read/write heads 114 are positioned can include components such as lasers, waveguides, and near-field transducers, among other components.

Figure 3:
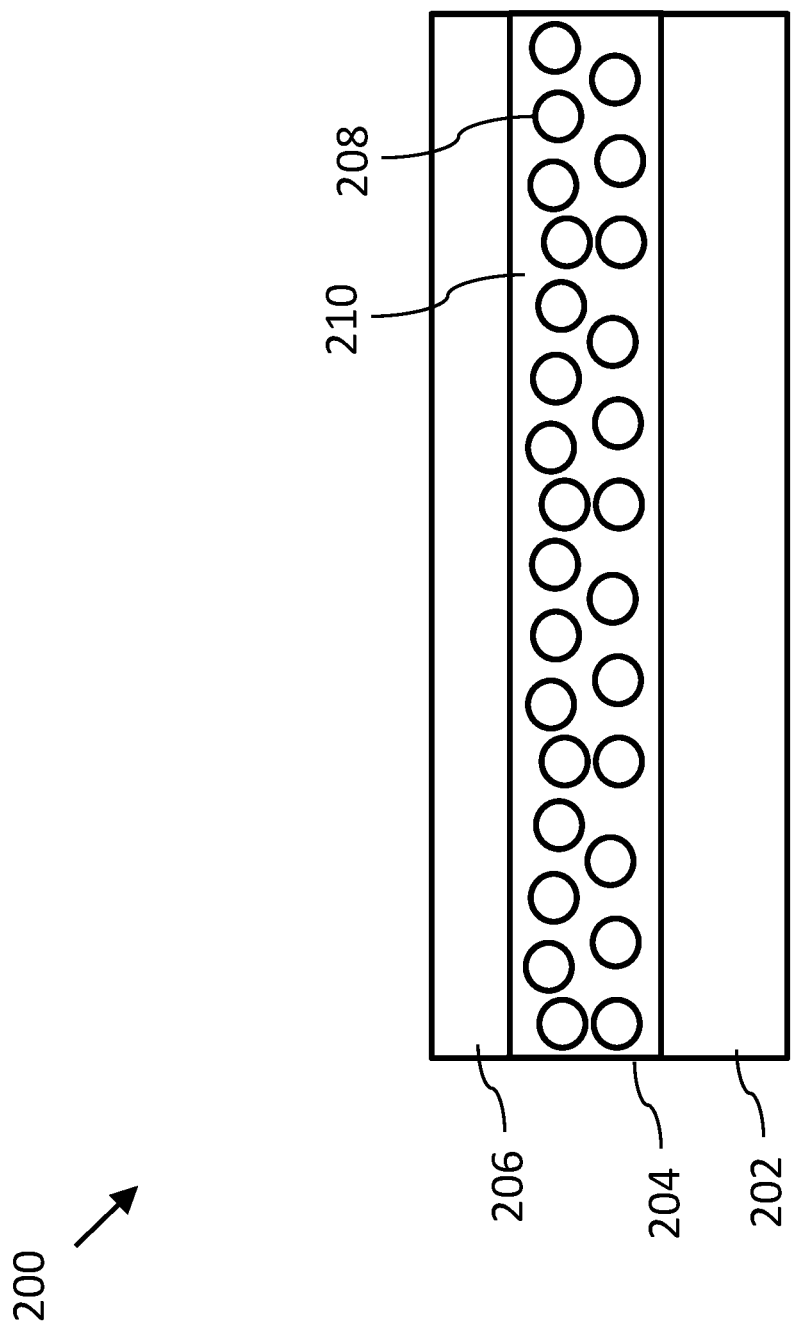
FIG. 3 shows a side cut-away view of tape, in accordance with certain embodiments of the present disclosure.

FIG. 3 shows a side cut-away view of a strip of tape 200. As will be described in more detail below, the tape 200 includes materials that absorb moisture (e.g., water or water vapor) and can be applied or adhered to various interior surfaces of hard disk drives.

In certain embodiments, the tape 200 includes a release liner layer 202, an adhesive layer 204, and a facestock layer 206. The adhesive layer 204 can include one or more materials that can absorb moisture. In FIG. 3, the moisture-absorptive material is represented by reference numbers 208. For brevity, the moisture-absorptive material will be referred to as the desiccant material 208. The desiccant material 208 can take the form of different shapes, such as beads or spheres as shown in FIG. 3. In certain embodiments, the desiccant material 208 comprises moisture-absorbent materials such as silica or molecular sieves.

In certain embodiments, the adhesive layer 204 can be considered to be infused with the desiccant material 208. For example, the adhesive layer 204 can include an adhesive material 210 in which the desiccant material 208 is suspended. The adhesive material 210 can be a pressure-sensitive adhesive. In certain embodiments, the adhesive material 210 is a rubber-based material or acrylic-based material, which may help reduce the risk of creating contamination compared to other types of materials. The adhesive material 210 can be formulated to mitigate the amount of constituents of the material that can outgas and contaminate components of hard disk drives.

The facestock layer 206 can be coated with the adhesive and desiccant materials from the adhesive layer 204 such that the facestock layer 206 is adhered to the adhesive layer 204. The facestock layer 206 can be permeable to moisture such that moisture can pass through the facestock layer 206 and reach the desiccant material 208 in the adhesive layer 204. The facestock layer 206 helps prevent the desiccant material 208 from being released from—or falling out of—the adhesive layer 204. However, in certain embodiments, the tape 200 does not include a facestock layer 206. Eliminating the facestock layer 206 can increase the available surface area of the desiccant material 208 that is exposed for increased moisture absorption. Further, removing the facestock layer 206 can create a tape 200 that has adhesive properties on both sides of the tape 200.

The release liner layer 202 is initially applied to the adhesive layer 204 such that the tape 200 can be handled by people or machines without the adhesive layer 204 adhering to those people or machines. Before the tape 200 is to be applied or adhered to a surface, the release liner layer 202 can be removed (e.g., peeled) from the tape 200 so that the adhesive layer 204 is exposed. As such, the release liner layer 202 can comprise a material that is easily removed or released from the adhesive layer 204.

In certain embodiments, the tape 200 is initially formed into a roll. As such, the tape 200 can be considered to be a flexible tape. The roll of tape can be partially or fully unrolled into a sheet. The tape 200 can then be cut (e.g., die-cut) into desired shapes, as will be described in more detail below. In certain embodiments, once the release liner layer 202 is removed, the tape 200 is between 10-50 micrometers thick (e.g., 15-40, 20-30, ~25 micrometers thick). The thickness of the tape 200 will depend on the desired size of the desiccant material 208 and/or the desired thickness of the facestock layer 206.

Figure 4:
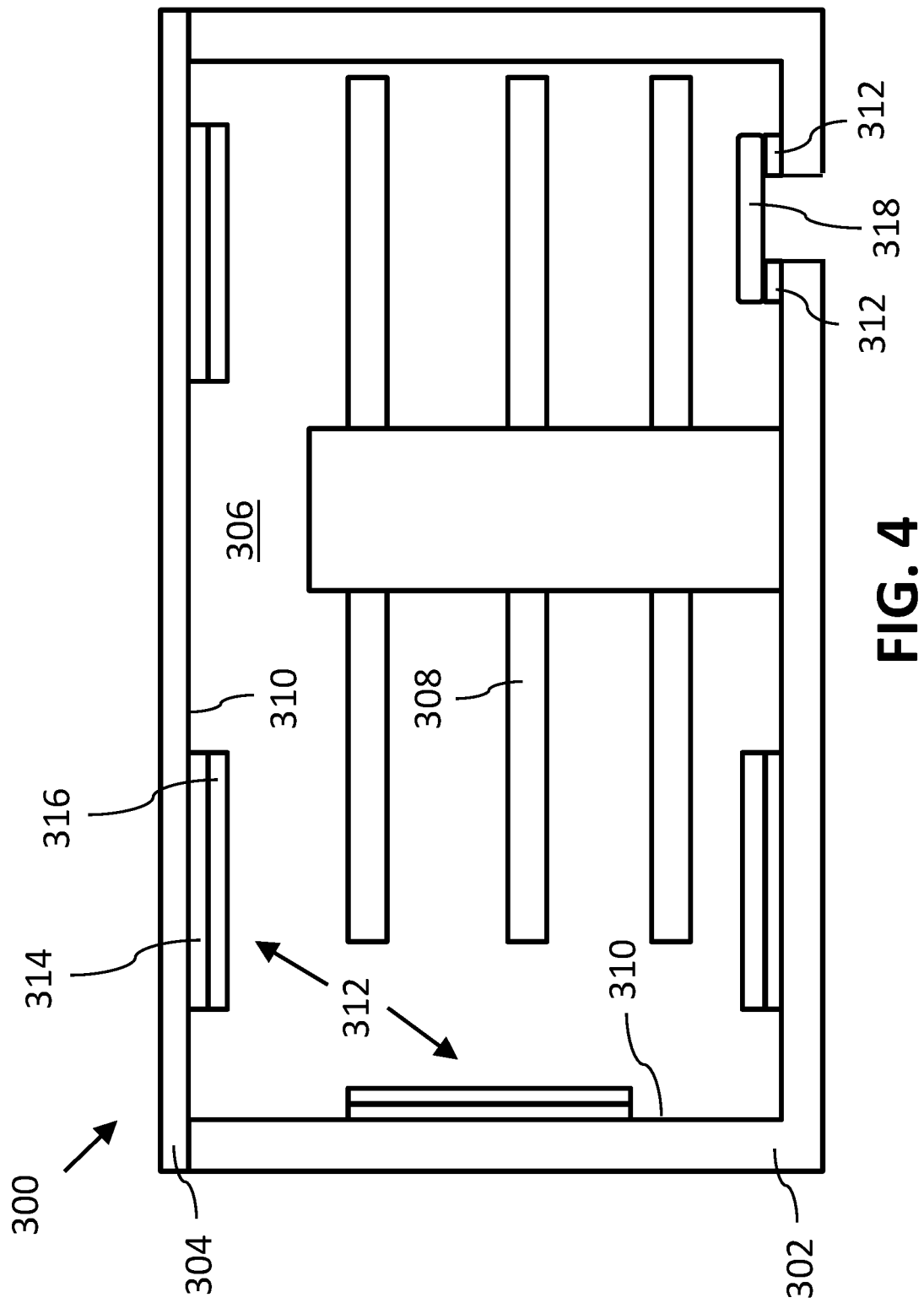
FIG. 4 shows a side cut-away view of a hard disk drive, in accordance with certain embodiments of the present disclosure.

FIG. 4 shows a cut-away side view of a hard disk drive 300. For simplicity and brevity, many features of hard disk drives shown in FIGS. 1 and 2 are not shown in FIG. 4, although it is appreciated that the hard disk drive 300 of FIG. 4 could include each of the features shown in FIGS. 1 and 2.

The hard disk drive 300 includes a base deck 302 and a top cover 304 that are coupled together to create an enclosure 306 in which various components (e.g., magnetic recording media 308) of the hard disk drive 300 are positioned.

The base deck 302 and the top cover 304 both include interior-facing surfaces 310. A tape 312 can be adhered to certain portions of the interior-facing surfaces 310. Like the tape 200 shown in FIG. 3, the tape 312 can include an adhesive layer 314 and a facestock layer 316. The adhesive layer 314 can include a moisture-absorbing material and can be used to adhere the tape 312 to the interior-facing surfaces 310 of the base deck 302 and the top cover 304.

As noted above, moisture can enter the enclosure 306 of the hard disk drive 300 in several ways. Too much moisture in the enclosure 306 can degrade performance and longevity of functions and components of the hard disk drive 300. Because the arrangement of components may limit the available space for a traditional environmental control assembly housing pouch or the size of such housing or pouch, the tape 312 can be used to increase the overall amount of moisture-absorbing material in the enclosure 306. Increasing the amount of moisture-absorbing material in the enclosure 306 can help reduce the amount of moisture content in the free-air space part of the enclosure 306. For example, the tape 312 can be applied to portions of the interior-facing surfaces 310 adjacent to spaces where a traditional environmental control assembly housing cannot fit. Thus, the tape 312 can provide flexibility in positioning moisture-absorbing materials within the enclosure 306 of the hard disk drive 300, particularly for hard disk drives sized to conform to smaller form factors and the lower heights.

Increasing the amount of moisture-absorbing material in the enclosure 306 (and therefore overall absorptive capacity) can also help reduce the expense of assembling the hard disk drive 300. For example, because the hard disk drive 300 has a higher tolerance for moisture in the enclosure 306, less stringent environmental controls (e.g., humidity level controls in cleanrooms) can be used when assembling the hard disk drive 300. Less stringent controls can reduce the cost of capital equipment and ongoing expenses during assembly.

The tape 312 can be positioned along the interior-facing surfaces 310 where the tape 312 will not interfere with operation of the hard disk drive 300. For example, in certain embodiments, the tape 312 is positioned away from a travel path of an actuator assembly and its arms/suspension.

Figure 5:
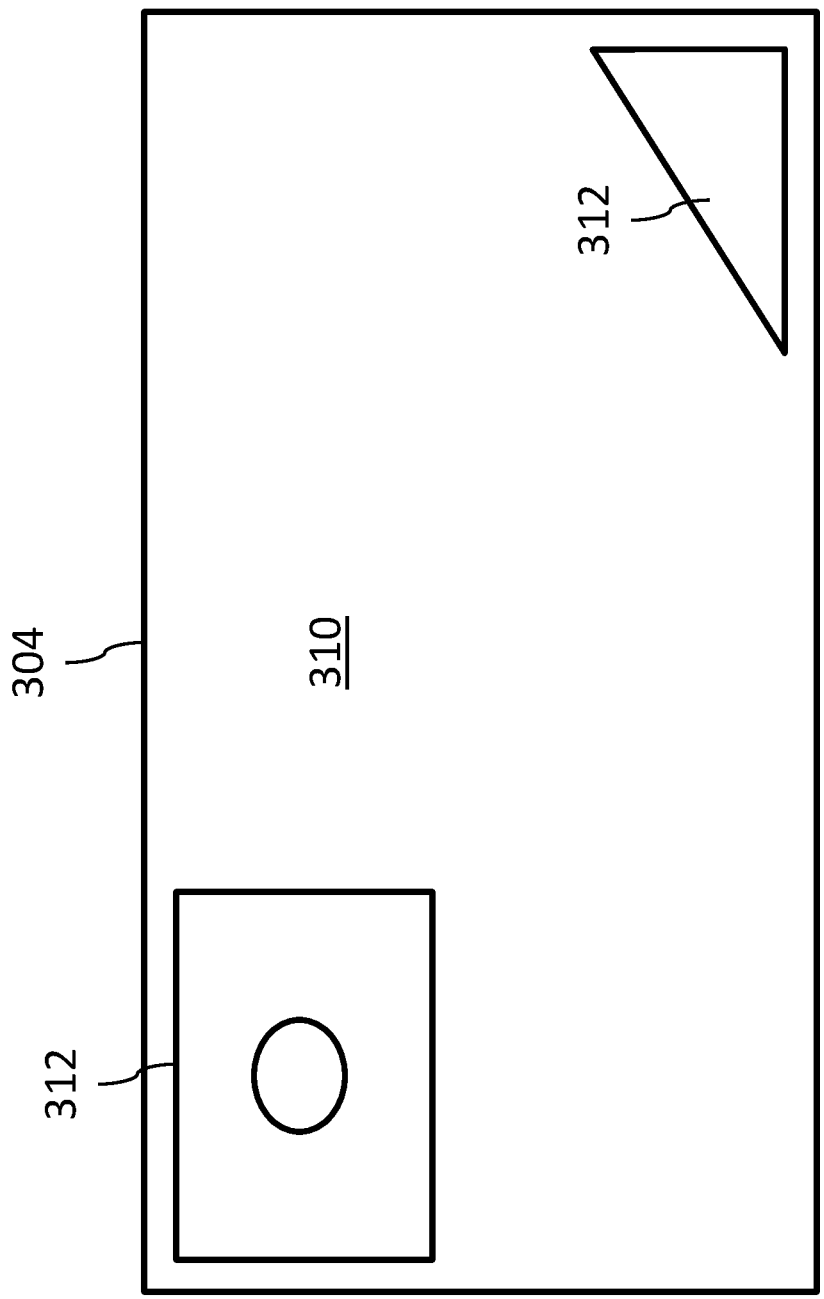
FIG. 5 shows a bottom view of a cover, in accordance with certain embodiments of the present disclosure.

As shown in FIG. 5, the tape 312 can be cut to custom sizes and shapes to fit particular areas of the hard disk drive 300. FIG. 5 shows a bottom view of the top cover 304. Different portions of the interior-facing surface 310 of the top cover 304 are covered by the tape 312. For example, one piece of tape 312 can be placed on the top cover 304 adjacent to where part (e.g., permanent magnet) of a voice coil motor is positioned. There may be limited space between the top cover 304 and the voice coil motor such that a traditional environmental control assembly housing or pouch cannot physically fit in the limited space. However, the tape 312 may be thin enough to fit in the limited space and therefore provide additional moisture-absorbing capacity for the hard disk drive 300. In addition to absorbing moisture, the tape 312 may dampen vibration of components that it is adhered to.

The tape 312 itself may have cut-outs such that the tape 312 can fit around components of the hard disk drive 300. For example, the tape 312 may have a circular cut-out such that the tape 312 can be placed around a motor or pivot bearing in the hard disk drive 300.

In certain embodiments, the tape 312 can be used to secure various components of the hard disk drive 300. For example, where the tape 312 does not include the facestock layer 316 (and therefore acts as a double-sided tape), the tape 312 can be used to secure an electrical connector 318 to the base deck 302. The base deck 302 may have an opening through which the electrical connector 318 at least partially extends, and the tape 312 can be used to secure or adhere the electrical connector 318 in the desired position. The tape 312 can be used to secure other components such as breather filters (e.g., carbon breather filters) positioned in the enclosure 306 of the hard disk drive 300.

Figure 6:
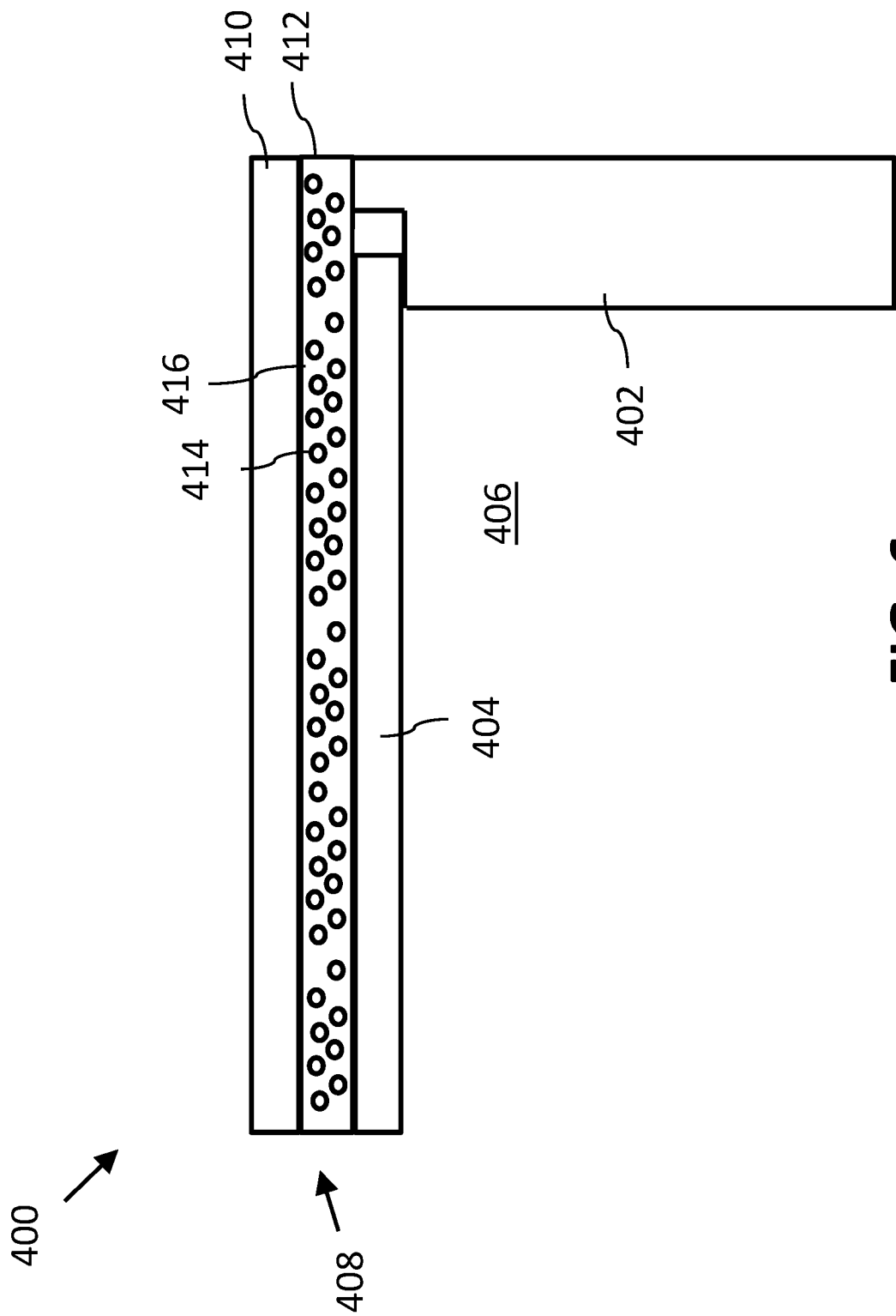
FIG. 6 shows a side cut-away view of a base deck, cover, and tape, in accordance with certain embodiments of the present disclosure.

FIG. 6 shows a cut-away side view of a portion a hard disk drive 400 with a base deck 402 coupled to a top cover 404 to create an enclosure 406.

As noted above, moisture can enter the enclosure 406 of the hard disk drive 400 in several ways. One of those ways is through the space between the base deck 402 and the top cover 404 where, typically, a form-in-place gasket (FIPG) is used to provide a seal between the base deck 402 and the top cover 404. In the embodiment shown in FIG. 6, tape 408 can be applied over some or all of the top cover 404 to help seal the hard disk drive 400.

The tape 408 shown in FIG. 6 includes a facestock layer 410 and an adhesive layer 412, although it is appreciated that additional layers can be incorporated into the tape 408 too. The adhesive layer 412 is adhered to the top cover 404 and the base deck 402. In certain embodiments, the facestock layer 410 comprises a metal such aluminum (e.g., aluminum foil). A metallic facestock layer adds stiffness to the tape 408, helps prevent puncturing of the tape 408, and allows the tape 408 to be bent or otherwise formed to maintain a shape/position. In certain embodiments, the facestock layer 410 includes additional materials such as polyethylene terephthalate (PET). In such embodiments, the facestock layer 410 may include the metallic layer positioned between the adhesive layer 412 and a layer of PET, which can protect the metallic layer from cosmetic defects like scratching.

The adhesive layer 412 includes a moisture-absorbing material 414 (hereinafter the "desiccant material 414") and an adhesive material 416. The adhesive layer 412 can be used to adhere the tape 408 to the base deck 402 and/or the top cover 404. Using the tape 408 can increase the ability to impede ingress of moisture through the space between the base deck 402 and the top cover 404. For example, as moisture attempts to pass through the space occupied by the tape 408, the moisture-absorbing material 414 in the adhesive layer 412 can absorb the moisture and slow down how quickly moisture can enter into the enclosure 406. In addition to positioning the tape 408 as shown in FIG. 6, separate pieces of tape 408 can be applied to internal surfaces of the hard disk drive 400 as described in more detail above.

Figure 7:
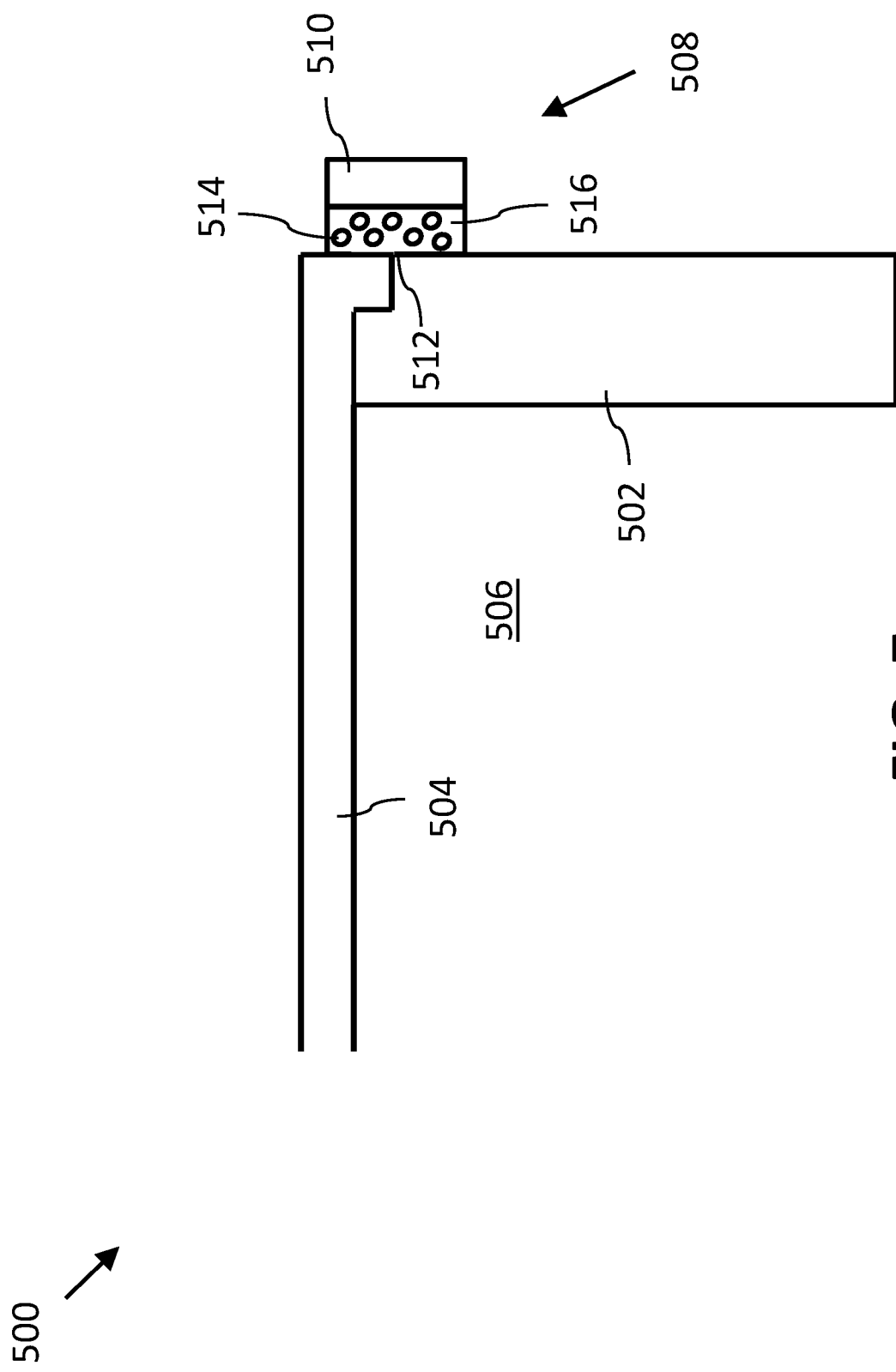
FIG. 7 shows a side cut-away view of a base deck, cover, and tape, in accordance with certain embodiments of the present disclosure.

FIG. 7 shows a cut-away side view of a portion a hard disk drive 500 with a base deck 502 coupled to a top cover 504 to create an enclosure 506.

As noted above, moisture can enter the enclosure 506 of the hard disk drive 500 in several ways. In the embodiment shown in FIG. 7, tape 508 can be applied over a portion of the top cover 504 and the base deck 502 to help seal the hard disk drive 500. For example, the tape 508 can be applied or adhered to the entire outer periphery of the base deck 502 and the top cover 504.

The tape 508 shown in FIG. 7 includes a facestock layer 510 and an adhesive layer 512, although it is appreciated that additional layers can be incorporated into the tape 508 too. The adhesive layer 512 is adhered to the top cover 504 and the base deck 502 along a side of the base deck 502. As shown in FIG. 7, a portion of the top cover 504 is positioned between the base deck 502 and the tape 508. This portion of the top cover 504 fits over or within a notch in the outer periphery of the base deck 502.

In certain embodiments, the facestock layer 510 comprises a metal such aluminum. A metallic facestock layer adds stiffness to the tape 508, helps prevent puncturing of the tape 508, and allows the tape 508 to be bent or otherwise formed to maintain a shape/position. In certain embodiments, the facestock layer 510 includes additional materials such as PET. In such embodiments, the facestock layer 510 may include the metallic layer positioned between the adhesive layer 512 and a layer of PET, which can protect the metallic layer from cosmetic defects like scratching.

The adhesive layer 512 includes a moisture-absorbing material 514 (hereinafter the "desiccant material 514") and an adhesive material 516. The adhesive layer 512 can be used to adhere the tape 508 to the base deck 502 and/or the top cover 504. Using the tape 508 can increase the ability to impede ingress of moisture through the space between the base deck 502 and the top cover 504. For example, as moisture attempts to pass through the space occupied by the tape 508, the moisture-absorbing material 514 in the adhesive layer 512 can absorb the moisture and slow down how quickly moisture can enter into the enclosure 506. In addition to positioning the tape 508 as shown in FIG. 7, separate pieces of tape 508 can be applied to internal surfaces of the hard disk drive 500 as described in more detail above.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A hard disk drive comprising:
   a base deck;
   a cover coupled to the base deck to create an enclosure; and
   tape covering at least a portion of the cover and the base deck and including an adhesive layer and a facestock layer, the adhesive layer comprises an adhesive material and a moisture-absorbent material, the facestock layer is adhered to the adhesive layer and comprises a water-permeable material.

2. The hard disk drive of claim 1, wherein the moisture-absorbent material is bead-shaped.

3. The hard disk drive of claim 1, wherein the moisture-absorbent material comprises silica or molecular sieves.

4. The hard disk drive of claim 1, wherein the facestock layer comprises metal.

5. The hard disk drive of claim 4, wherein the adhesive layer is positioned between the facestock layer and the base deck or the cover.

6. The hard disk drive of claim 1, wherein the tape extends around an entire periphery of the base deck and the cover.

7. The hard disk drive of claim 6, wherein the tape comprises a single continuous piece of tape around the entire periphery of the base deck and the cover.

8. The hard disk drive of claim 1, wherein the hard disk drive does not include a form-in-place gasket.

9. The hard disk drive of claim 1, wherein the tape includes multiple separate pieces of tape, wherein at least one of the pieces of tape is adhered to an interior surface of the base deck or the cover.

10. The hard disk drive of claim 1, wherein the adhesive material is an acrylic-based material or a rubber-based material.

11. The hard disk drive of claim 1, wherein the tape has a thickness of 10-50 micrometers.

12. The hard disk drive of claim 1, wherein the tape includes multiple separate pieces of tape, wherein at least one of the pieces of tape adheres an electrical connector to the base deck.

13. A hard disk drive comprising:
a base deck;
a cover coupled to the base deck to create an enclosure, the enclosure having an interior surface of the base deck and an interior surface of the cover; and
tape adhered to at least one of the interior surfaces and including an adhesive layer and a facestock layer, the adhesive layer comprising an adhesive material in which a moisture-absorbent material is suspended, wherein the facestock layer is adhered to the adhesive layer and comprises a water-permeable material.

14. The hard disk drive of claim 13, wherein the tape includes multiple pieces of tape, wherein at least one of the pieces of tape is adhered to the interior surface of the base deck, wherein at least one of the other pieces of tape is adhered to the interior surface of the cover.

15. The hard disk drive of claim 13, wherein the moisture-absorbent material comprises silica or molecular sieves.

16. The hard disk drive of claim 13, wherein the adhesive material is an acrylic-based material or a rubber-based material.

17. The hard disk drive of claim 13, wherein the hard disk drive further includes a separate piece of tape that adheres an electrical connector to the base deck.

18. The hard disk drive of claim 13, wherein the tape is adhered to the cover adjacent to a voice coil motor.

19. The hard disk drive of claim 13, wherein the tape has a thickness of 10-50 micrometers.

20. A method for assembling a hard disk drive, the method comprising:
coupling a cover to a base deck of the hard disk drive; and
applying a piece of tape to both the cover and the base deck such that the tape is adhered to the cover and the base deck, wherein the tape includes a facestock layer and an adhesive layer, the facestock layer is adhered to the adhesive layer and comprises a water-permeable material, the adhesive layer comprising an adhesive material and a moisture-absorbent material.

* * * * *